United States Patent
Miller

(10) Patent No.: US 10,341,089 B2
(45) Date of Patent: Jul. 2, 2019

(54) HIGH-SPEED AES WITH TRANSFORMED KEYS

(71) Applicant: Microsemi Corp. - Security Solutions, West Lafayette, IN (US)

(72) Inventor: Scott D. Miller, West Lafayette, IN (US)

(73) Assignee: MICROSEMI CORP. - SECURITY SOLUTIONS, West Lafayette, IN (US)

( * ) Notice: Subject to any disclaimer, the term of this patent is extended or adjusted under 35 U.S.C. 154(b) by 171 days.

(21) Appl. No.: 15/134,274

(22) Filed: Apr. 20, 2016

(65) Prior Publication Data

US 2017/0302439 A1    Oct. 19, 2017

Related U.S. Application Data

(60) Provisional application No. 62/149,855, filed on Apr. 20, 2015.

(51) Int. Cl.
*H04L 9/00* (2006.01)
*H04L 9/06* (2006.01)

(52) U.S. Cl.
CPC ......... *H04L 9/0631* (2013.01); *H04L 9/002* (2013.01); *H04L 2209/16* (2013.01)

(58) Field of Classification Search
CPC ... H04W 84/045; H04W 92/02; H04W 12/04; H04W 12/06; H04W 88/08
See application file for complete search history.

(56) References Cited

U.S. PATENT DOCUMENTS

| | | | |
|---|---|---|---|
| 2009/0214026 A1* | 8/2009 | Gueron | H04L 9/0631 380/29 |
| 2010/0054461 A1* | 3/2010 | Ciet | H04L 9/002 380/29 |
| 2012/0093313 A1 | 4/2012 | Michiels | |
| 2012/0159186 A1 | 6/2012 | Farrugia et al. | |
| 2013/0067212 A1 | 3/2013 | Farrugia et al. | |
| 2014/0348323 A1 | 11/2014 | Chevallier-Mames et al. | |

OTHER PUBLICATIONS

International Search Report and Written Opinion dated Jul. 18, 2016; issued by the International Searching Authority for related PCT Application No. PCT/US2016/028507.
Mattias Beimers: "White-box cyptography—Implementing cryptographic algorithms in hostile environments" dated Nov. 12, 2014.

* cited by examiner

*Primary Examiner* — Ghazal B Shehni
(74) *Attorney, Agent, or Firm* — Dickinson Wright PLLC

(57) ABSTRACT

The Advanced Encryption Standard (AES) cipher can be performed in a manner that preserves the secrecy of cryptographic keys, even under the intense scrutiny of a reverse-engineer observing every aspect of the computation. A method can include loading a key in a non-standard representation. The method can also include processing the key with respect to data in at least three first type rounds and a plurality of second type rounds. The processing the key with respect to data can include either encrypting the data using the key or decrypting the data using the key. The first type rounds can be configured to maintain an order of channels of bits at an output from the order of corresponding channels of bits at an input. The second type rounds can be configured to vary the order of channels of bits at an output from the order of corresponding channels of bits at an input.

2 Claims, 6 Drawing Sheets

HIGH-SPEED AES WITH TRANSFORMED KEYS

CROSS-REFERENCE TO RELATED APPLICATION

The present application is related to and claims the benefit and priority of U.S. Provisional Patent Application No. 62/149,855, filed Apr. 20, 2015, the entirety of which is hereby incorporated herein by reference.

BACKGROUND

Field

The Advanced Encryption Standard (AES) cipher can be performed in a manner that preserves the secrecy of cryptographic keys, even under the intense scrutiny of a reverse-engineer observing every aspect of the computation.

Description of the Related Art

The Advanced Encryption Standard (AES) is a symmetric block cipher believed to offer a high degree of security. This assertion is supported by the inclusion of AES as the basis for all symmetric-block and stream ciphers in the National Institute of Science and Technology (NIST) Suite B Cryptography specification.

As with all cryptographic primitives, AES primitives are designed with the assumption that the AES computations will be performed in private, such that an adversary can observe, at most, the input and output of the primitive. This assumption of privacy-during-computation is made in the design of every established cryptographic cipher. Unfortunately, such private places to execute software rarely exist; vulnerabilities are frequently uncovered that compromise assumed-secure networked servers (most recently, "Heartbleed" for OpenSSL); physical devices are routinely reverse-engineered by amateur-enthusiasts, academics in security fields, and commercial competitors, many with surprising access to expensive reverse-engineering technology and tools.

For example, a reverse-engineer watching the computations of a traditional AES implementation will see the key being loaded into memory to construct the AES Key Schedule. The reverse engineer can simply extract the key from memory, and subsequently encrypt/decrypt, eavesdrop on secure sessions, or forge digital signatures as if s/he were the authentic version of the compromised server or device.

"White-box" AES implementations that may attempt to address the above issues are not frequently published because of an expectation that publication may lead to their compromise. The white-box cryptography designs by Chow and Eisen of Cloakware are believed to have been published in the academic literature. The white-box AES implementation of Intertrust is based on a multi-channel finite-state automaton source-code transformation of a traditional AES implementation. Such "white-box" techniques are typically understood in the academic community to be obfuscated variants of the original ciphers.

Additionally, general anti-reverse-engineering protections can be applied over standard cryptographic implementations to help secure key material, particularly if keys are reconstructed from source material just-in-time before use. Machine-code level obfuscation, including instruction rewriting, basic block shuffling, and artificial path-merging, as well as anti-tampering protection can be added to arbitrary software. Multiple language- and platform-specific tools can offer the same machine-code level obfuscations. These automated machine-code obfuscation techniques typically have performance impacts, and are typically restricted to software implementations Another option for securing keys is to execute the cryptography on a secure processor/Hardware Security Module (HSM). This approach typically is only applicable to server hardware. One cannot expect, for example, the average consumer of digital content to install a HSM in each content-consuming device in their home. HSMs are high cost, and depreciate as cryptography standards or hardware technologies change. Secure processors and HSMs are also subject to the same amateur-enthusiasts, academics, and commercial competitors as above, potentially rendering a hardware investment insecure with no path to remediation.

A related option is to encapsulate devices in security enclosures, whether at the chip, board, device, or assembly level. This approach is typically costly, as a custom-engineered security enclosure must typically be fit to the device in question. Such physical security comes with a side effect of fragility, and so this approach also introduces logistical concerns during shipping and field-maintenance/returned-merchandise support.

Thus, the security proofs that make traditional cryptography a valuable tool may hang on a premise that is not attained in reality. Alternatively, attempting to provide such security may result in performance compromises or limited areas of implementation.

SUMMARY

According to certain embodiments, a method can include loading a key in a non-standard representation. The method can also include processing the key with respect to data in at least three first type rounds and a plurality of second type rounds. The processing the key with respect to data can include either encrypting the data using the key or decrypting the data using the key. The first type rounds can be configured to maintain an order of channels of bits at an output from the order of corresponding channels of bits at an input. The second type rounds can be configured to vary the order of channels of bits at an output from the order of corresponding channels of bits at an input.

In certain embodiments, an apparatus can include a first first type round unit provided at an input. The apparatus can also include a second first type round unit operatively connected to the first first type round unit. The apparatus can further include a plurality of second type round units operatively connected to the second first type round unit. The apparatus can additionally include a third first type round unit operatively connected to at least one of the plurality of second type round units and configured to provide an output based on data provided at the input. The first type rounds can be configured to maintain an order of channels of bits at an output from the order of corresponding channels of bits at an input. The second type rounds can be configured to vary the order of channels of bits at an output from the order of corresponding channels of bits at an input.

BRIEF DESCRIPTION OF THE DRAWINGS

For proper understanding of the invention, reference should be made to the accompanying drawings, wherein.

DETAILED DESCRIPTION

Certain embodiments of the present invention can perform the Advanced Encryption Standard (AES) cipher in a manner that preserves the secrecy of cryptographic keys, even under the intense scrutiny of a reverse-engineer observing every aspect of the computation. For example, certain embodiments can protect the secrecy of cryptographic keys even when the fundamental assumption of privacy-during-computation is violated. This method may have utility anywhere that devices implementing AES may potentially enter the hands of adversarial parties. Thus, this method may be applicable in use cases such as, for example, defense, Digital Rights Management (DRM), securing the update process for deployed end-user applications, or the like.

Certain embodiments of the present invention eliminate the requirement that the AES computations be performed in private or at least significantly attenuate the effects of violating such a privacy requirement. That is, certain embodiments provide a method of performing AES without using a traditional representation of the key. The key-representation according to certain embodiments of the present invention is difficult to convert back to the traditional representation, and hence offers a line of defense against reverse-engineering.

Using a method of AES computation according to certain embodiments of the present invention, a reverse-engineer may be prevented from seeing the key. Instead, the reverse engineer may see a sequence of bytes with a non-linear relationship to the key.

In addition, an AES implementation according to certain embodiments of the present invention may be high-speed despite the anti-reverse-engineering measures, offering a performance profile similar to traditional AES implementations in software.

Certain embodiments of the present invention include three or more copies of a combinatorial logic circuit called the "non-permuted round unit"; a set of copies of a combinatorial logic circuit called the "permuted round unit"; a collection of registers and clocking logic that coordinate the operation of the round units; and specially formed data that populate the look-up-tables (LUTs) within the round units.

Figure 1:
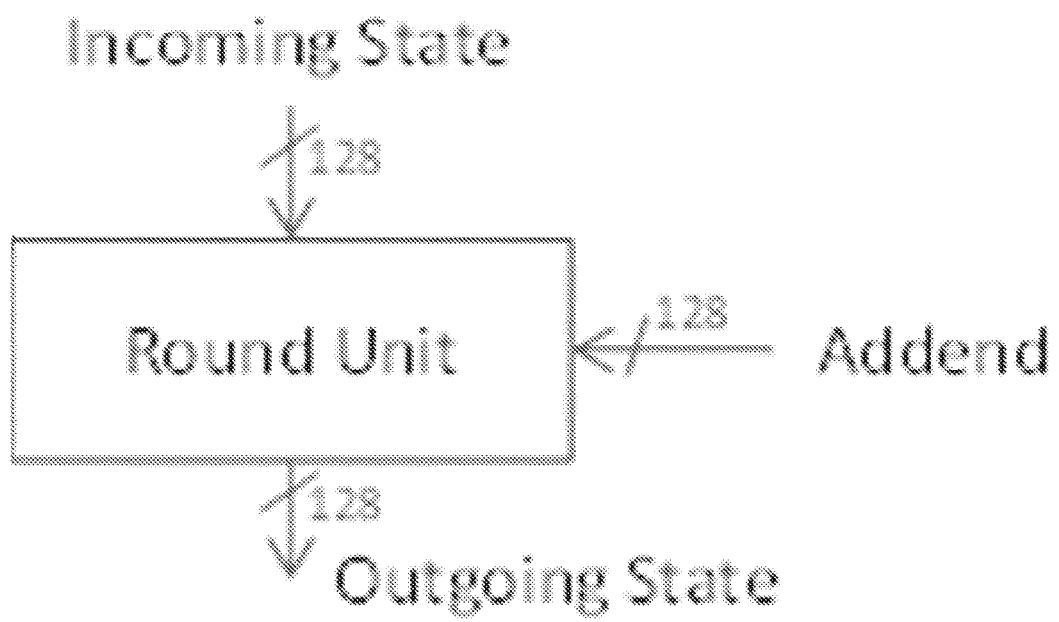
FIG. 1 illustrates an external interface of a round unit function according to certain embodiments of the present invention.

FIG. 1 illustrates an external interface of a round unit function according to certain embodiments of the present invention. Note that the permuted and non-permuted round units may use the same interface. Each round unit can take two 128-bit inputs: an incoming state representation, and a representation of the key material for the round to be processed. The 128-bit output can be produced as a combinatorial function of the inputs, and can contain a representation of the cipher state after processing the round. Neither the state representation nor the round-key representation may adhere to the AES specification for this implementation, except for the incoming state for the first round unit, and the outgoing state on the last round unit.

An AES implementation can be constructed from the round units by chaining them, such that the output state of one round unit provides the input state to the next round unit. The total number of round units to be chained may depend on the AES key-size to be implemented. Regardless of the AES key-size, there may be three or more non-permuted round units: at least two as initial rounds, and at least one as the final round. The number of permuted round units that occur may be a function of the AES key-size. For example, for AES-128, 10 permuted round units may be used, for AES 192, 12 permuted round units may be used, and for AES-256, 14 permuted round units may be used.

Depending on timing considerations, the round units may be chained asynchronously or the round units may be pipelined. Here, pipelined can refer to the round units being chained with a register between each unit, with a clock governing the capture of intermediate outputs. The fully-pipelined construction, with a register inserted between each round unit may permit the highest clock rates.

Figure 2:
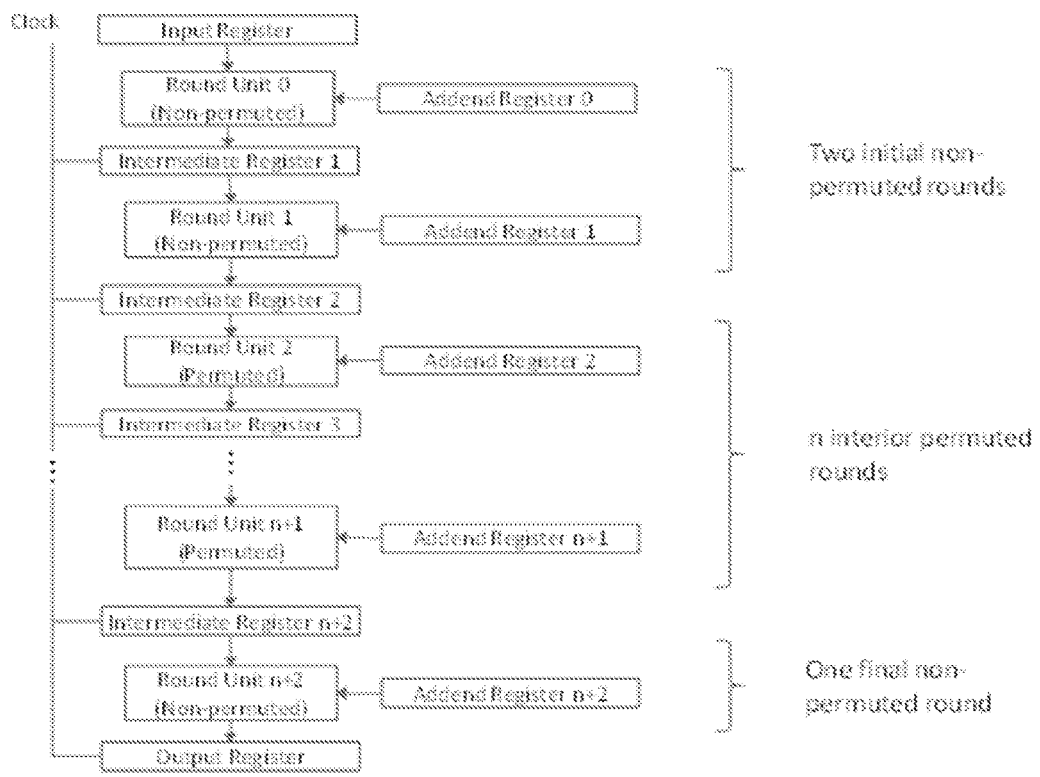
FIG. 2 illustrates a fully-pipelined construction according to certain embodiments of the present invention.

FIG. 2 illustrates a fully-pipelined construction according to certain embodiments of the present invention. More particularly, FIG. 2 illustrates a fully pipelined AES construction from chaining of round units, such as those illustrated in FIG. 1. As shown in FIG. 2, there can be two initial non-permuted rounds and one final non-permuted round. There can also be n interior permuted rounds. To implement AES-128, n can be 10, as mentioned above.

Figure 3:
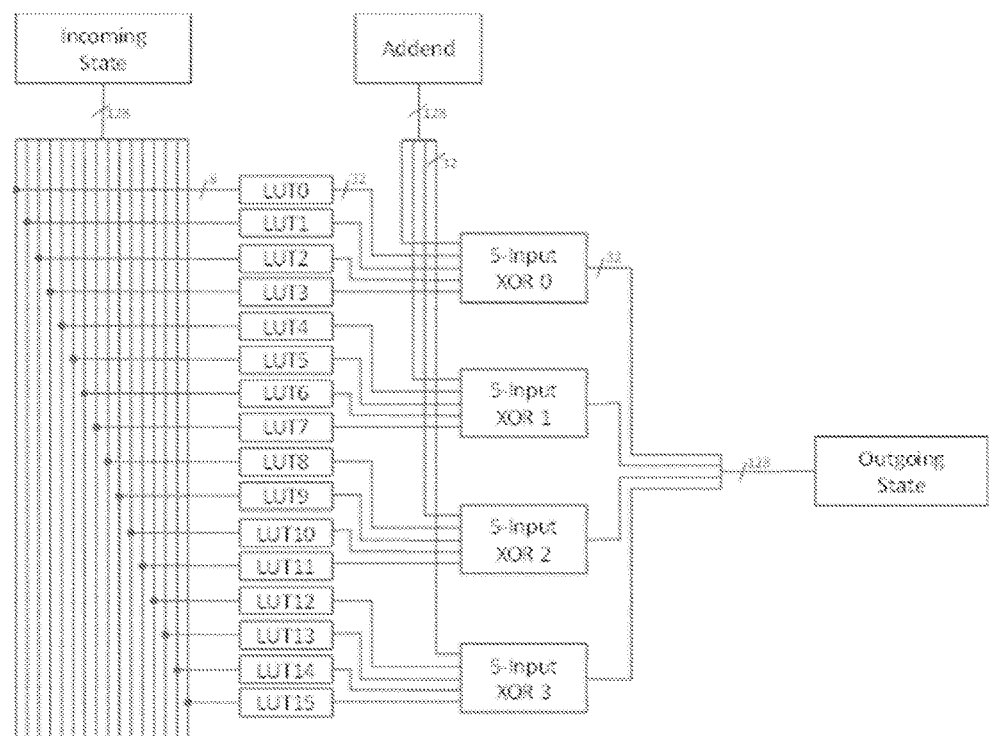
FIG. 3 illustrates a "non-permuted round unit" according to certain embodiments of the present invention.
Figure 4:
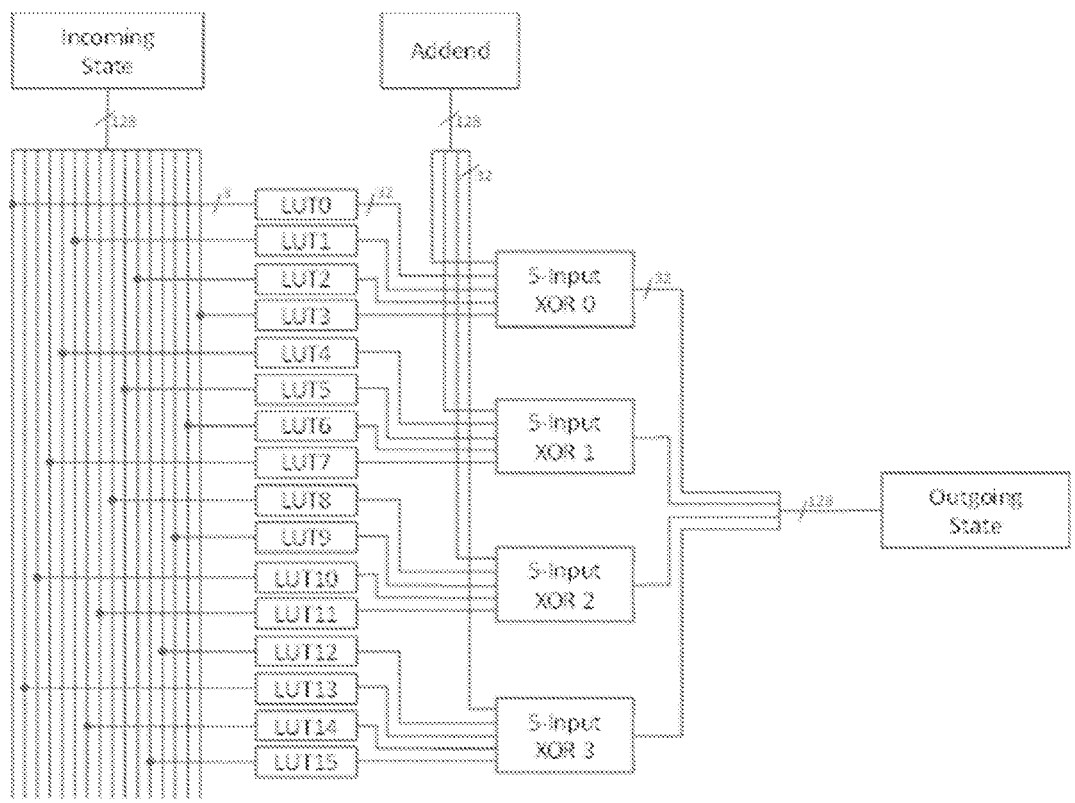
FIG. 4 illustrates a "permuted round unit" consistent with AES encryption according to certain embodiments of the present invention.

The non-permuted and permuted round units are illustrated in FIG. 3 and FIG. 4, respectively. As shown in FIGS. 3 and 4, a 128-bit input can be first divided into 16 8-bit channels, each made up of adjacent signals. That is, channel 0 may include bits 0-7 of the incoming state, channel 1 may include bits 8-15, and so on. Each channel can be routed to a distinct look-up table (LUT), where the value of the channel provides the index to select from the LUT. The routing of channels to LUTs for the non-permuted round unit can be such that channel k routes to LUT k. For permuted round units, the routing of input channels to LUTs can be, for example, as illustrated in Table 1. It is possible to share/re-use LUTs both within and across round units through careful preparation of the LUT data, but alternatively distinct LUTs can be used for each copy of the round unit.

TABLE 1

Mapping from input channel to controlled LUT in a permuted round unit consistent with AES encryption.

| Input Channel | LUT |
|---|---|
| 0 | 0 |
| 1 | 12 |
| 2 | 8 |
| 3 | 4 |
| 4 | 5 |
| 5 | 1 |
| 6 | 13 |
| 7 | 9 |
| 8 | 10 |
| 9 | 6 |
| 10 | 2 |
| 11 | 14 |
| 12 | 15 |
| 13 | 11 |
| 14 | 7 |
| 15 | 3 |

The next phase of computation can divide the round key into four 32-bit channels, and can combine each channel with the 32-bit outputs from four LUTs using exclusive disjunction (XOR). The output of each XOR computation can provide a 32-bit segment of the outgoing state. Thus the outputs of the XOR operations can be concatenated to produce the complete outgoing state.

The following discussion provides a technique for constructing LUT table data and the key material data, such that the preceding circuit can produce results equivalent to the AES cipher, while maintaining the desired secrecy of the effective AES key. Other techniques are also permitted.

As mentioned above, the Advanced Encryption Standard (AES), standardized in FIPS publication 197, is a symmetric block cipher, with 16-byte blocks, in which the input, output, and working state are treated as arrays of elements of the "Rijndael field", $F=F_2[x]/\langle x^8+x^4+x^3+x+1\rangle$. For simplicity, F and $F_2$ are used in this discussion to indicate the Rijndael field and GF(2), respectively, though there exist several other standard methods for indicating these fields.

The preceding definition for F indicates that elements in F are polynomials (defined with dummy variable x) with coefficients in $F_2$, taken modulo the specified polynomial. The modulus guarantees that the elements of F are degree-7 or less, and hence there is a natural representation of elements of F as bytes: Since the coefficients are in $F_2$, they are representable as either 0 or 1. To represent an element of F as a byte, one can assign the highest-order coefficient to the most-significant bit of the byte, and continue assigning the next-highest-order coefficient to the next-most-significant byte and so on. To decode such a representation, one can let $b_i(\cdot)$ be a function that extracts the i-th bit of the byte-typed argument, numbering the least-significant bit as bit-0; then ToPoly($\alpha$):=$(\Sigma_{i=0}^7 b_i(\alpha)x^i)$ can provide the conversion back to polynomial form. This is the standard method of representing elements in F as bytes, and the common notation for a such a polynomial-in-byte-form is to use curly braces surrounding hexadecimal digits; e.g., $x^4+x^3+x+1=\{1b\}$.

Addition of elements in F can be notated as $\oplus$, and can follow the rules for ordinary algebraic addition of polynomials except that addition of coefficients can occur in $F_2$ rather than R or Z. Multiplication of elements in F, notated $\otimes$, can follow the usual pattern for polynomial multiplication, but can then be subjected to modular reduction by the Rijndael polynomial (i.e., one can divide by the Rijndael polynomial, and keep the remainder). As with addition, all arithmetic on coefficients can occur in $F_2$. Addition in $F_2$ is exclusive disjunction, commonly called "bitwise XOR". Similarly, multiplication in $F_2$ is conjunction, commonly called "bitwise AND".

Addition in F is effectively a set of independent additions in $F_2$. Therefore, packing the 8 1-bit coefficients of a member of F into a single byte can permit addition in F to be implemented as bitwise XOR between such representations-as-bytes. Packing several such bytes into larger machine-words may also offer the ability to build a Single Instruction Multiple Data (SIMD) implementation of addition in F. Unfortunately, multiplication in F is more difficult, and has no such convenient mapping to the 2's complement arithmetic most modern CPUs implement.

AES includes several operations forming a "round." The round-processing can be iterated a certain number of times depending on the key-length used. Keys can be processed into a "key-schedule" with a "round-key" for every round of processing. AES can keep a working state as a 16-vector with elements in F. The working state after round r can be denoted as $w_r \in F^{16} = \langle w_{r,0}, w_{r,1}, \ldots, w_{r,15}\rangle$; $w_{r,i} \in F$. Round keys can also be 16-vectors with elements in F. Thus, for the r-th round, $k_r \in F^{16} = \langle k_{r,0}, k_{r,1}, \ldots, k_{r,15}\rangle$; $k_{r,i} \in F$.

The operations that occur during an AES round are described below. For the purposes of exposition, let $\sigma \in F^{16} = \langle \sigma_0, \sigma_1, \ldots, \sigma_{15}\rangle$; $\sigma_i \in F$ denote a dummy argument representing intermediate results within an AES round computation.

A first operation can be to add a round key. This operation can update the working AES state by adding, to each element, the corresponding element of the round key for the current round: AddRoundKey($\sigma$, $k_r$):=$\sigma \oplus k_r$; $\sigma$, $k_r \in F^{16}$. Here, it is used implicitly that the field-addition operator applies to vectors in the usual, element-wise way.

A next operation can be to apply the mix columns and/or inverse mix columns step. This operation can partition the working state into 4 4-vectors, and left-multiply each by one of the following matrices:

$$M = \begin{bmatrix} \{02\} & \{03\} & \{01\} & \{01\} \\ \{01\} & \{02\} & \{03\} & \{01\} \\ \{01\} & \{01\} & \{02\} & \{03\} \\ \{03\} & \{01\} & \{01\} & \{02\} \end{bmatrix}$$

if encrypting, or $$M^{-1} = \begin{bmatrix} \{0e\} & \{0b\} & \{0d\} & \{09\} \\ \{09\} & \{0e\} & \{0b\} & \{0d\} \\ \{0d\} & \{09\} & \{0e\} & \{0b\} \\ \{0b\} & \{0d\} & \{09\} & \{0e\} \end{bmatrix}$$

if decrypting.

For example, if $\omega_\alpha(\sigma):=[\sigma_\alpha, \sigma_{\alpha+1}, \sigma_{\alpha+2}, \sigma_{\alpha+3}]$ is used to denote a contiguous 4-element segment of the input vector beginning at position $\alpha$, then the working state can be partitioned as $w_r=[\omega_0(w_r), \omega_4(w_r), \omega_8(w_r), \omega_{12}(w_r)]^T$. Given such a partition of the working state, the update to the working state can be computed as MixColumns($\sigma$):=$[M\omega_0(\sigma), M\omega_4(\sigma), M\omega_8(\sigma), M\omega_{12}(\sigma)]^T$ for encrypt, or InverseMixColumns($\sigma$):=$[M^{-1}\omega_0(\sigma), M^{-1}\omega_4(\sigma), M^{-1}\omega_8(\sigma), M^{-1}\omega_{12}(\sigma)]^T$ for decrypt.

A third operation can be to apply the shift rows and/or inverse shift rows step. This operation can perform a permutation of the order of elements within the working state. In one implementation, a permutation and its inverse, p[i] and $p^{-1}[i]$, can be defined as lookup tables, as follows:

| | Index | Value | | Index | Value |
|---|---|---|---|---|---|
| p[i] = | 0 | 0 | $p^{-1}[i]$ = | 0 | 0 |
| | 1 | 5 | | 1 | 13 |
| | 2 | 10 | | 2 | 10 |
| | 3 | 15 | | 3 | 7 |
| | 4 | 4 | | 4 | 4 |
| | 5 | 9 | | 5 | 1 |
| | 6 | 14 | | 6 | 14 |
| | 7 | 3 | | 7 | 11 |
| | 8 | 8 | | 8 | 8 |
| | 9 | 13 | | 9 | 5 |
| | 10 | 2 | | 10 | 2 |
| | 11 | 7 | | 11 | 15 |
| | 12 | 12 | | 12 | 12 |
| | 13 | 1 | | 13 | 9 |
| | 14 | 6 | | 14 | 6 |
| | 15 | 11 | | 15 | 3 |

Then the update to the working state can be ShiftRows($\sigma$):=$[\sigma_{p[0]}, \sigma_{p[1]}, \ldots, \sigma_{p[15]}]^T$ for encrypt, or InverseShiftRows($\sigma$):=$[\sigma_{p^{-1}[0]}, \sigma_{p^{-1}[1]}, \ldots, \sigma_{p^{-1}[15]}]^T$ for decrypt.

A further operation can be to apply the sub bytes and/or inverse sub bytes step. This operation can perform an element-wise substitution of the working state, using a substitution table called an "S-box", for encryption, or an "inverse S-box" for decryption. The specific substitution tables for the S-box and its inverse are fixed in FIPS publication 197, and are omitted here for brevity. In this discussion, s[•] can denote the S-box, and $s^{-1}[•]$ can denote the inverse S-box. The update to the working state can then be SubBytes$(\sigma):=[s[\sigma_0], s[\sigma_1], \ldots, s[\sigma_{15}]]^T$ for encrypt, and InverseSubBytes$(\sigma):=[s^{-1}[\sigma_0], s^{-1}[\sigma_1], \ldots, s^{-1}[\sigma_{15}]]^T$ for decrypt.

All AES rounds can be constructed using these above-described operations. The first and last rounds may omit certain steps. In particular, the first round of encryption may include only an AddRoundKey operation, whereas the final round of encryption may omit the MixColumns operation. By contrast, all interior rounds of encryption can use all four steps in the order given, or alternatively in another order. The decryption operation can be performed using the same sequence, substituting the inverse operations, according to the "Equivalent Inverse Cipher" as described in FIPS 197.

For certain embodiments, the AES cipher can be manipulated. For example, in the AES cipher, the Mix Columns/Inverse Mix Columns operation may be the only step that performs multiplication in F. Further, for each multiplication, one of the operands may be restricted to the set {{01}, {02}, {03}, {09}, {0b}, {0d}, {0e}} by the fact that the Mix Columns matrices are fixed in the specification. Thus pre-multiplication tables can be efficiently constructed with size 7×256=1,792 bytes. The pre-multiplication can be extended further by noting that, due to the nature of matrix-vector multiplication, each value in a given column of the matrix will be multiplied by the same value from the vector operand.

Thus, pre-multiplication tables can store the precomputed outcome of multiplying all elements in a column with each possible element that could appear in the working state. This approach may yield fewer lookups, while requiring more space: 8×256×4=8,192 bytes, for 8 distinct columns (4 from each matrix), 256 possible operands from the working state, and a 4-element result. Denoting the i-th column of M and $M^{-1}$ as $M_i$ and $M_i^{-1}$, respectively, then the column-wise (scalar-vector) pre-multiplication tables can be defined as follows:

$$\rho[\alpha,\beta]:=\alpha \otimes M_\beta$$

$$\rho^{-1}[\alpha,\beta]:=\alpha \otimes M_\beta^{-1}$$

Here, $\beta \in [0,3]$ gives the column number, and $\alpha$ specifies the field-element against which the column elements are to be multiplied.

Given such pre-multiplication tables, the state-update for Mix Columns can be re-written as follows:

$$MixColumns(\sigma) := \begin{bmatrix} \rho[\sigma_0, 0] \oplus \rho[\sigma_1, 1] \oplus \rho[\sigma_2, 2] \oplus \rho[\sigma_3, 3] \\ \rho[\sigma_4, 0] \oplus \rho[\sigma_5, 1] \oplus \rho[\sigma_6, 2] \oplus \rho[\sigma_7, 3] \\ \rho[\sigma_8, 0] \oplus \rho[\sigma_9, 1] \oplus \rho[\sigma_{10}, 2] \oplus \rho[\sigma_{11}, 3] \\ \rho[\sigma_{12}, 0] \oplus \rho[\sigma_{13}, 1] \oplus \rho[\sigma_{14}, 2] \oplus \rho[\sigma_{15}, 3] \end{bmatrix}$$

In other words, all field-multiplication can be replaced by table-lookups, with the results being combined via field-addition. Likewise, the state-update for Inverse Mix Columns can become $$InverseMixColumns(w_r) := \begin{bmatrix} \rho^{-1}[\sigma_0, 0] \oplus \rho^{-1}[\sigma_1, 1] \oplus \rho^{-1}[\sigma_2, 2] \oplus \rho^{-1}[\sigma_3, 3] \\ \rho^{-1}[\sigma_4, 0] \oplus \rho^{-1}[\sigma_5, 1] \oplus \rho^{-1}[\sigma_6, 2] \oplus \rho^{-1}[\sigma_7, 3] \\ \rho^{-1}[\sigma_8, 0] \oplus \rho^{-1}[\sigma_9, 1] \oplus \rho^{-1}[\sigma_{10}, 2] \oplus \rho^{-1}[\sigma_{11}, 3] \\ \rho^{-1}[\sigma_{12}, 0] \oplus \rho^{-1}[\sigma_{13}, 1] \oplus \rho^{-1}[\sigma_{14}, 2] \oplus \rho^{-1}[\sigma_{15}, 3] \end{bmatrix}$$

In the following discussion, encryption operation is addressed, although decryption can be similarly addressed. When performing AES encryption, the typical AES round can use the sequence: Sub Bytes, Shift Rows, Mix Columns, and Add Round Key. The first and last rounds can use a subset of these steps, as described above.

Sub Bytes can act independently on each byte, and Shift Rows operation simply moves the bytes around. Thus, the order of these operations can be swapped with no effect. Doing so, and composing the definitions above, the typical encryption round can be expressed as $$Round(\sigma, k) := \begin{bmatrix} \rho[s[\sigma_{p[0]}], 0] \oplus \rho[s[\sigma_{p[1]}], 1] \oplus \rho[s[\sigma_{p[2]}], 2] \oplus \rho[s[\sigma_{p[3]}], 3] \\ \rho[s[\sigma_{p[4]}], 0] \oplus \rho[s[\sigma_{p[5]}], 1] \oplus \rho[s[\sigma_{p[6]}], 2] \oplus \rho[s[\sigma_{p[7]}], 3] \\ \rho[s[\sigma_{p[8]}], 0] \oplus \rho[s[\sigma_{p[9]}], 1] \oplus \rho[s[\sigma_{p[10]}], 2] \oplus \rho[s[\sigma_{p[11]}], 3] \\ \rho[s[\sigma_{p[12]}], 0] \oplus \rho[s[\sigma_{p[13]}], 1] \oplus \rho[s[\sigma_{p[14]}], 2] \oplus \rho[s[\sigma_{p[15]}], 3] \end{bmatrix} \oplus k$$

where $\sigma$ represents the incoming state, and k represents the round key. This expression yields the following observations. First, one may observe that $\rho$ and s can both be table-lookups, and can therefore be composed into a single table-lookup. Furthermore, one may observe that the indices used with the shift-rows permutation, p[•], can all be constant, and thus can be pre-computed. Moreover, all field-addition can be performed as SIMD, packed into 32-bit XOR operations, particularly when the pre-multiplication tables produce their output packed into 32-bit words, and the round key is stored so as to be addressable as 4 32-bit words.

One way to counter reverse-engineering is to ensure that the keys and the intermediate working values are all kept and used in non-standard representations. For example, in certain embodiments no element of the working state within the registers directly corresponds to any intermediate value produced by the algorithm as described in FIPS 197.

The alternative representations can be a translation to an equivalent representative in a field defined by the polynomials with coefficients in $F_2$ modulo an arbitrary degree-8 irreducible polynomial distinct from the Rijndael polynomial. These fields are isomorphic to the Rijndael field, and retain the property that field-addition is bitwise exclusive disjunction (XOR). The number of representations can be further expanded, for example, by permitting arbitrary bit-permutations of the representatives in these fields—offering a total of 8!*30=1,209,600 total possible representations—or by accommodating an arbitrary degree-7 polynomial addend. The alternative representations can also be referred to as non-standard representations.

An alternative representation can be assigned to each 8-bit segment of the working state, as it occurs after each round unit. Thus, for example, the first 8-bit segment of the working state after the first round unit may receive a different representation-assignment than the first 8-bit segment of the working state after the second round unit, and so on. The LUT contents can be computed to expect the assigned incoming representation, and to produce results subject to the output representation.

Let $\xi_{r,i}[\bullet]$ be a function that applies the alternative representation assigned to the i-th 8-bit segment of the working state after round r, and let $\xi_{r,i}^{-1}[\bullet]$ denote its inverse. In such a case, if $w_{r,i}$ denotes the i-th 8-bit segment of the working state after round r in the classical cipher, an implementation according to certain embodiments of the present invention may hold $\xi_{r,i}[w_{r,i}]$ in that position instead. Because much of the cipher deals with 32-bit segments of the working state, $\Xi_{r,i}[\bullet]$ can denote the application of the alternative representation to four consecutive 8-bit segments of the working state, starting with the representation for segment i of the state after round r. That is, for a vector $z=[\alpha,\beta,\gamma,\delta]^T$, $\Xi_{r,i}[z]=[\xi_{r,i}[\alpha],\xi_{r,i+1}[\beta],\xi_{r,i+2}[\gamma],\xi_{r,i+3}[\delta]]^T$. Likewise, $\Xi_{r,i}^{-1}[\bullet]$ can denote the inverse operation.

Under this scheme, an independent alternative data-representation can be assigned to each element of the working state for each round. For AES-128, there can be 16*(2+n)=176 distinct representations in use. Two representations can be used for the outputs of the non-permuted round units and n for the permuted round units. The final non-permuted round unit may need to produce its output according to the FIPS 197 standard.

Earlier, the look-up tables for non-encoded values had been defined as follows: $\rho[\alpha, \beta]:=\alpha \otimes M_\beta$.

To support the security objective, the lookup table can be redefined to produce the alternative representation. One such look-up table can be defined as $\hat{\rho}[\alpha,r,i]:=\Xi_{r,i}[\rho[\alpha,i\%4]]$. This definition takes advantage of the relationship that the i-th 8-bit segment of the working state, after the application of Shift Rows and Sub Bytes, is multiplied against column (i %4) of the Mix Columns matrix, where '%' denotes the modulus operator. Thus the location of the scalar operand within the incoming state uniquely determines the matrix column against which the value will be multiplied.

As mentioned above, there can be a 16-element round-key for each round. As before, let $k_{r,i}$ denote the i-th position of the round-key for the r-th round. When using alternative representations for the data in the working state, some care may be required to ensure that field-addition can still be performed. Because field-addition remains XOR under the alternative representations, one may need only to ensure that both operands to a field-addition operation are supplied in the same alternative representation. Thus the assignment of $\xi_{r,i}[\bullet]$ to the working state implies an alternative representation assignment for $k_{r-1,i}$ so that field-addition remains well-defined. Hence, $\hat{k}_r=[\hat{k}_{r,0}, \hat{k}_{r,1}, \ldots, \hat{k}_{r,15}]^T$ can be defined such that $\hat{k}_{r,i}:=\xi_{r+1,i}[k_{r,i}]$, providing an alternative representation of the round key.

Because field-addition remains XOR even under alternative representations, the round expression can be updated to a variant that produces the alternate representation on the output:

expected to be supplied in the alternate encoding. The incoming state may still be expected in the standard representation in this expression. However, adjusting for a non-standard representation of the incoming state can also be performed.

Let $\hat{w}_{r,i}=\xi_{r,i}[w_{r,i}]$ denote the working state element $w_{r,i}$ as encoded into its assigned alternative representation. To support the alternative data representations on the incoming state to the round function, the index-order of the tables can be modified to expect data in the alternative representation. Let $\hat{s}_{r,i}[\alpha]:=s[\xi_{r,i}^{-1}[\alpha]]$ be a modified S-box, such that it accepts an alternately-represented input, but produces from it the result as defined in FIPS-197. Then $\hat{s}$ can be substituted for s in the preceding round-function to yield the desired result. Let $\phi_{r,i}(\alpha):=\hat{\rho}[\hat{s}_{r,p[i]}[\alpha],r,i]$; then:

$$\text{Round}''(\hat{\sigma}, r, \hat{k}) := \begin{bmatrix} \phi_{r,0}(\hat{\sigma}_{p[0]}) & \oplus \phi_{r,1}(\hat{\sigma}_{p[1]}) & \oplus \phi_{r,2}(\hat{\sigma}_{p[2]}) & \oplus \phi_{r,3}(\hat{\sigma}_{p[3]}) \\ \phi_{r,4}(\hat{\sigma}_{p[4]}) & \oplus \phi_{r,5}(\hat{\sigma}_{p[5]}) & \oplus \phi_{r,6}(\hat{\sigma}_{p[6]}) & \oplus \phi_{r,7}(\hat{\sigma}_{p[7]}) \\ \phi_{r,8}(\hat{\sigma}_{p[8]}) & \oplus \phi_{r,9}(\hat{\sigma}_{p[9]}) & \oplus \phi_{r,10}(\hat{\sigma}_{p[10]}) & \oplus \phi_{r,11}(\hat{\sigma}_{p[11]}) \\ \phi_{r,12}(\hat{\sigma}_{p[12]}) & \oplus \phi_{r,13}(\hat{\sigma}_{p[13]}) & \oplus \phi_{r,14}(\hat{\sigma}_{p[14]}) & \oplus \phi_{r,15}(\hat{\sigma}_{p[15]}) \end{bmatrix} \oplus \hat{k}.$$

Thus, a round function can be provided for which the incoming and outgoing state are each represented per their distinct assigned alternative representations, and for which the round-keys are accepted in the an alternate representation. Note that the only standard-representation values used in this version of the round function may be constants. Thus, this function may represent a complete algebraic description of a fully protected typical AES round-function per a design according to certain embodiments of the present invention.

In such embodiments, however, there is only one unknown introduced, namely, the alternative representation. By contrast, ideally unknowns would be presented in pairs, to make reverse engineering more difficult. Also, the preceding design reveals the final round-key. This is because the output-representation of a round determines the key-representation of the round. Thus, given the requirement that the implementation produce output per the FIPS 197 standard, the final round-key may be exposed. These issues may be addressed by additional countermeasure designs.

To address the issue of introducing a single unknown on the first round, an identity computation can be introduced. Given a block-diagonal invertible matrix $R \in GL_{16}(F)$ with blocks in $GL_4(F)$, the initial-round of the AES computation can be replaced with the computationally equivalent sequence $$t = Rx_0 \oplus r_0$$

$$w = R^{-1}t \oplus (k_0 \ominus R^{-1}r_0)$$

$$\text{Round}'(\sigma, r, \hat{k}) := \begin{bmatrix} \hat{\rho}[s[\sigma_{p[0]}], r, 0] & \oplus \hat{\rho}[s[\sigma_{p[1]}], r, 1] & \oplus \hat{\rho}[s[\sigma_{p[2]}], r, 2] & \oplus \hat{\rho}[s[\sigma_{p[3]}], r, 3] \\ \hat{\rho}[s[\sigma_{p[4]}], r, 4] & \oplus \hat{\rho}[s[\sigma_{p[5]}], r, 5] & \oplus \hat{\rho}[s[\sigma_{p[6]}], r, 6] & \oplus \hat{\rho}[s[\sigma_{p[7]}], r, 7] \\ \hat{\rho}[s[\sigma_{p[8]}], r, 8] & \oplus \hat{\rho}[s[\sigma_{p[9]}], r, 9] & \oplus \hat{\rho}[s[\sigma_{p[10]}], r, 10] & \oplus \hat{\rho}[s[\sigma_{p[11]}], r, 11] \\ \hat{\rho}[s[\sigma_{p[12]}], r, 12] & \oplus \hat{\rho}[s[\sigma_{p[13]}], r, 13] & \oplus \hat{\rho}[s[\sigma_{p[14]}], r, 14] & \oplus \hat{\rho}[s[\sigma_{p[15]}], r, 15] \end{bmatrix} \oplus \hat{k}$$

Thus, the round function can depend on the round number as well as the working state, and the round-key can be where t denotes a temporary value, $x_0$ is the 16-vector of input to AES, $r_0$ is a random 16-vector of values, and $k_0$ is the 16-vector round key for the first AES round. The field-subtraction operator, $\ominus$, can be identical to field-addition in extension fields over $F_2$, such as F is. The preceding sequence can be equivalent to Add Round Key as $$w = R^{-1}t \oplus (k_0 \ominus R^{-1}r_0)$$
$$= R^{-1}(Rx_0 \oplus r_0) \oplus$$
$$(k_0 \ominus R^{-1}r_0)$$
$$= x_0 \oplus R^{-1}r_0 \oplus k_0 \ominus$$
$$R^{-1}r_0$$
$$= x_0 \oplus k_0$$

By implementing the first multiplication, $Rx_0$, using a pre-multiplication table, two unknowns can be introduced at once: the unknown matrix R, and the unknown output encoding. Then the remainder of the alternative first-round computation can be performed under the encoding, leveraging additional unknown values $r_0$, $R^{-1}$, and $k_0$. This countermeasure can be one reason to include the initial two non-permuted round units; they can compute the initial AES round per the identity above. Without the random addend $r_0$ in the first step, the multiplication $R^{-1}t$ in the second step would yield $x_0$ as an intermediate value with only the unknown representation to mask it. In other words, without the random added in the first step, the technique would be back into a position where only a single unknown is being leveraged.

To mitigate the risk of exposing the final round key, $k_f$, the same identity, used above, can be applied to the final round. Thus, the round-key can be additively masked $(k_f \ominus S^{-1}r_f)$ before being exposed. That is, for the final round, the following computational sequence can be used:

$$t = Sx_f \oplus r_f$$

$$w = S^{-1}t \oplus (k_f \ominus S^{-1}r_f)$$

where S is a randomly selected block-diagonal matrix in $GL_{16}(F)$ with blocks in $GL_4(F)$. $x_f$ can be the intermediate state after the Sub Bytes and Shift Rows have been processed for the final AES round, $r_f$ can be a random vector in $F^{16}$, and $k_f$ can be the round-key for the last AES round.

Effectively, the initial and final AES rounds can thus be split into two steps each. The non-permuted round units can be provided to support this splitting. The new intermediate working states this splitting generates can be covered by the assignment of alternative representations. Thus, the new random addends can also be subject to the assigned alternative representations for the output of each new intermediate state.

The first AES round can include only the Add Round Key operation, which can be split into two affine computations in $GL_{16}(F)$, each of which can be implemented using a lookup-table based multiplication analogous to the typical AES round. In this case, the matrix columns may all be distinct; let $R_{i,j}$ denote the j-th column of the i-th block of R (zero-based indices). Likewise, let $R_{i,j}^{-1}$ denote the analogous 4-vector from $R^{-1}$. Further, define $\hat{u}(\alpha,i,j) := \Xi_{0,4i}[\alpha \otimes R_{i,j}]$ and $\hat{u}^{-1}(\hat{\alpha},i,j) := \Xi_{1,4i}[\xi_{0,4i+j}^{-1}(\hat{\alpha}) \otimes R_{i,j}^{-1}]$ as the functions that define the multiplication-table content, for the initial non-permuted round units, respectively. Here, i can select the block along the diagonal of R or $R^{-1}$, and j can select the column within the block. $\alpha$ and $\hat{\alpha}$ can denote the scalar operand, in the standard representation for the first non-permuted round, and in the alternate representation for the second non-permuted round, respectively. Thus, the following can be provided:

$$FirstRound(\sigma) := \begin{bmatrix} \hat{u}(\sigma_0, 0, 0) & \oplus \hat{u}(\sigma_1, 0, 1) & \oplus \hat{u}(\sigma_2, 0, 2) & \oplus \hat{u}(\sigma_3, 0, 3) \\ \hat{u}(\sigma_4, 1, 0) & \oplus \hat{u}(\sigma_5, 1, 1) & \oplus \hat{u}(\sigma_6, 1, 2) & \oplus \hat{u}(\sigma_7, 1, 3) \\ \hat{u}(\sigma_8, 2, 0) & \oplus \hat{u}(\sigma_9, 2, 1) & \oplus \hat{u}(\sigma_{10}, 2, 2) & \oplus \hat{u}(\sigma_{11}, 2, 3) \\ \hat{u}(\sigma_{12}, 3, 0) & \oplus \hat{u}(\sigma_{13}, 3, 1) & \oplus \hat{u}(\sigma_{14}, 3, 2) & \oplus \hat{u}(\sigma_{15}, 3, 3) \end{bmatrix} \oplus \hat{r}_0$$

$$SecondRound(\hat{\sigma}) :=$$

$$\begin{bmatrix} \hat{u}^{-1}(\hat{\sigma}_0, 0, 0) & \oplus \hat{u}^{-1}(\hat{\sigma}_1, 0, 1) & \oplus \hat{u}^{-1}(\hat{\sigma}_2, 0, 2) & \oplus \hat{u}^{-1}(\hat{\sigma}_3, 0, 3) \\ \hat{u}^{-1}(\hat{\sigma}_4, 1, 0) & \oplus \hat{u}^{-1}(\hat{\sigma}_5, 1, 1) & \oplus \hat{u}^{-1}(\hat{\sigma}_6, 1, 2) & \oplus \hat{u}^{-1}(\hat{\sigma}_7, 1, 3) \\ \hat{u}^{-1}(\hat{\sigma}_8, 2, 0) & \oplus \hat{u}^{-1}(\hat{\sigma}_9, 2, 1) & \oplus \hat{u}^{-1}(\hat{\sigma}_{10}, 2, 2) & \oplus \hat{u}^{-1}(\hat{\sigma}_{11}, 2, 3) \\ \hat{u}^{-1}(\hat{\sigma}_{12}, 3, 0) & \oplus \hat{u}^{-1}(\hat{\sigma}_{13}, 3, 1) & \oplus \hat{u}^{-1}(\hat{\sigma}_{14}, 3, 2) & \oplus \hat{u}^{-1}(\hat{\sigma}_{15}, 3, 3) \end{bmatrix} \oplus \begin{bmatrix} \Xi_{1,0}(k_0 \ominus R^{-1}r_0) \\ \Xi_{1,4}(k_0 \ominus R^{-1}r_0) \\ \Xi_{1,8}(k_0 \ominus R^{-1}r_0) \\ \Xi_{1,12}(k_0 \ominus R^{-1}r_0) \end{bmatrix}$$

Likewise, for the final round, define $\hat{v}(\hat{\alpha},i,j) := \Xi_{n+1,4i}[\hat{s}_{n+1,p[4i+j]}[\hat{\alpha}] \otimes S_{i,j}]$ and $\hat{v}^{-1}(\hat{\alpha},i,j) := \xi_{n+1,4i+j}^{-1}(\hat{\alpha}) \otimes S_{i,j}^{-1}$:

$$PenultimateRound(\hat{\sigma}) := \begin{bmatrix} \hat{v}(\hat{\sigma}_{p[0]}, 0, 0) & \oplus \hat{v}(\hat{\sigma}_{p[1]}, 0, 1) & \oplus \hat{v}(\hat{\sigma}_{p[2]}, 0, 2) & \oplus \hat{v}(\hat{\sigma}_{p[3]}, 0, 3) \\ \hat{v}(\hat{\sigma}_{p[4]}, 1, 0) & \oplus \hat{v}(\hat{\sigma}_{p[5]}, 1, 1) & \oplus \hat{v}(\hat{\sigma}_{p[6]}, 1, 2) & \oplus \hat{v}(\hat{\sigma}_{p[7]}, 1, 3) \\ \hat{v}(\hat{\sigma}_{p[8]}, 2, 0) & \oplus \hat{v}(\hat{\sigma}_{p[9]}, 2, 1) & \oplus \hat{v}(\hat{\sigma}_{p[10]}, 2, 2) & \oplus \hat{v}(\hat{\sigma}_{p[11]}, 2, 3) \\ \hat{v}(\hat{\sigma}_{p[12]}, 3, 0) & \oplus \hat{v}(\hat{\sigma}_{p[13]}, 3, 1) & \oplus \hat{v}(\hat{\sigma}_{p[14]}, 3, 2) & \oplus \hat{v}(\hat{\sigma}_{p[15]}, 3, 3) \end{bmatrix} \oplus \hat{r}_f$$

-continued $$\text{FinalRound}(\hat{\sigma}) := \begin{bmatrix} \hat{v}^{-1}(\hat{\sigma}_0, 0, 0) & \oplus \hat{v}^{-1}(\hat{\sigma}_1, 0, 1) & \oplus \hat{v}^{-1}(\hat{\sigma}_2, 0, 2) & \oplus \hat{v}^{-1}(\hat{\sigma}_3, 0, 3) \\ \hat{v}^{-1}(\hat{\sigma}_4, 1, 0) & \oplus \hat{v}^{-1}(\hat{\sigma}_5, 1, 1) & \oplus \hat{v}^{-1}(\hat{\sigma}_6, 1, 2) & \oplus \hat{v}^{-1}(\hat{\sigma}_7, 1, 3) \\ \hat{v}^{-1}(\hat{\sigma}_8, 2, 0) & \oplus \hat{v}^{-1}(\hat{\sigma}_9, 2, 1) & \oplus \hat{v}^{-1}(\hat{\sigma}_{10}, 2, 2) & \oplus \hat{v}^{-1}(\hat{\sigma}_{11}, 2, 3) \\ \hat{v}^{-1}(\hat{\sigma}_{12}, 3, 0) & \oplus \hat{v}^{-1}(\hat{\sigma}_{13}, 3, 1) & \oplus \hat{v}^{-1}(\hat{\sigma}_{14}, 3, 2) & \oplus \hat{v}^{-1}(\hat{\sigma}_{15}, 3, 3) \end{bmatrix} \oplus (k_n \ominus S^{-1} r_f)$$

In summary, certain embodiments of the present invention can include a method of performing the AES cipher using combinatorial and sequential logic (see, for example, FIGS. 2, 3, and 4), in conjunction with data-tables produced according to the definitions $\phi(\bullet,\bullet)$, $\hat{u}(\bullet,\bullet,\bullet)$, $\hat{u}^{-1}(\bullet,\bullet,\bullet)$, $\hat{v}(\bullet,\bullet,\bullet)$, and $\hat{v}^{-1}(\bullet,\bullet,\bullet)$. Specifically, for the first non-permuted round LUT(i) can be populated using the definition $\hat{u}(\bullet,\lfloor i/4 \rfloor, i \%4)$; for the second non-permuted round LUT(i) can be populated using the definition $\hat{u}^{-1}(\bullet, \lfloor i/4 \rfloor, i \%4)$; for the first n−1 permuted rounds LUT(i) can be populated using the definition $\phi(r,i)$, for round $r \in [2,n]$; for the final permuted round LUT(i) can be populated using the definition $\hat{v}(\bullet,\lfloor i/4 \rfloor, i \%4)$; and for the final non-permuted round LUT(i) can be populated using the definition $\hat{u}^{-1}(\bullet,\lfloor i/4 \rfloor, i \%4)$.

Only the forward cipher has been presented above, for the sake of brevity. The reverse cipher can be similarly constructed according to the same design using the "Equivalent Inverse Cipher" (as described in FIPS Publication 197), by substituting the inverse S-box, $s^{-1}[\bullet]$, for the S-box, $s[\bullet]$; the Inverse Shift Rows permutation, $p^{-1}[\bullet]$, for the Shift Rows permutations, $p[\bullet]$ (and correspondingly, the inverse permuted round unit of FIG. 5 for the permuted round unit of FIG. 4); and the Inverse Mix Columns matrix, $M^{-1}$, for the Mix Columns matrix, M.

Figure 5:
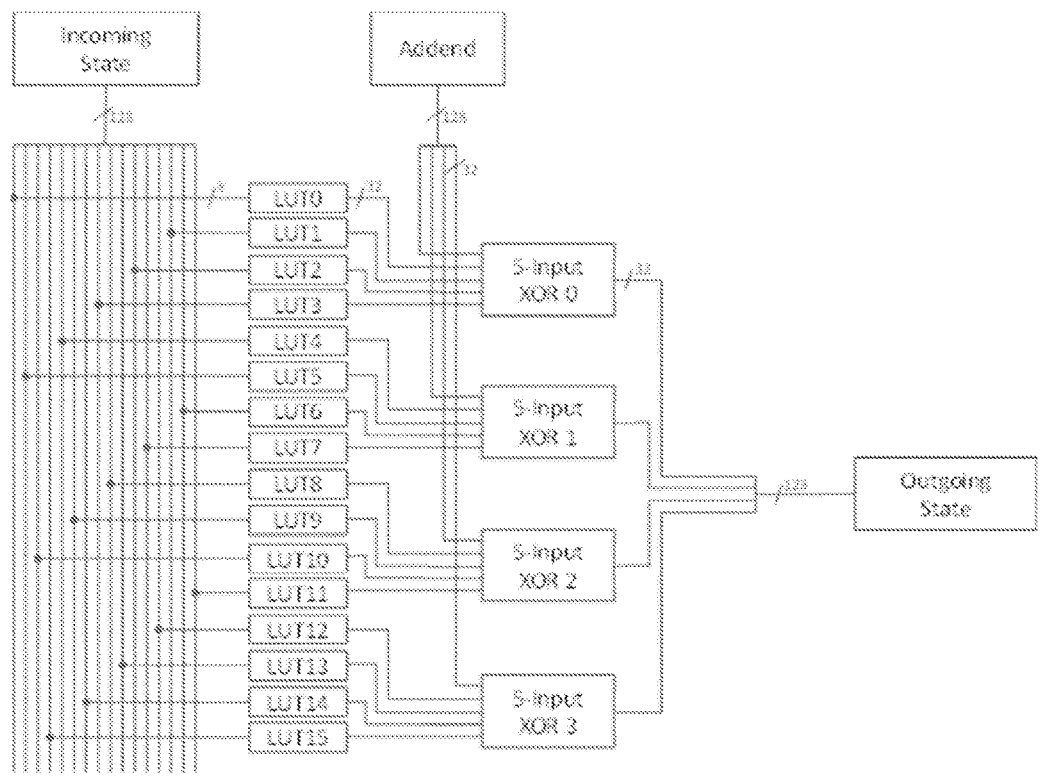
FIG. 5 illustrates an "inverse permuted round unit" consistent with AES decryption according to certain embodiments of the present invention.

FIG. 5 illustrates an inverse permuted round unit according to certain embodiments of the present invention. As can be seen from a comparison of FIG. 4 and FIG. 5, the round unit of FIG. 5 can provide an inverse permutation corresponding to the permutation provided by the round unit of FIG. 4.

The above-described embodiments can be variously modified. For examples, there are several fields isomorphic to the Rijndael field over which AES is defined. Accepting the input to AES, or producing the output of AES as representatives in any field isomorphic to the Rijndael field can be similarly performed in certain embodiments.

The above-described implementation uses pre-multiplication tables encoding four multiplications each. The pre-multiplication tables can be variously encoded to produce 1, 2, 3, or 4 multiplications at a time.

The above-illustrated designs constrain the alternative representations to those for which field-addition is implemented as XOR of the field representatives. There are numerous other representations for which field-addition can be carried out by a different mathematical process. Use of these representations is also permitted.

An additional layer of security can be added by layering error-addends onto the output of the $\phi_{r,i,j}$ table outputs, and cancelling them off by a corresponding error-addend on the round key/random addends. Further, each element of the working state may be assigned an expected error-addend. In this latter case, the error addend may be accounted for in the indexing of the $\phi_{r,i,j}$ tables, and the round-key addends may be adjusted to cancel the addends contributed from the $\phi_{r,i,j}$ tables, but may also incorporate production of any error addend that may be expected on the next round's working state.

Certain embodiments may use alternative representations that are byte-for-byte. That is, encoding 4 bytes of input data can produce 4 bytes of output data. While this may reduce the amount of space required during execution, there are certainly other representations for the encoding which preserve field-addition-is-XOR, such as applying a basis change to a higher-dimension basis as part of the encoding process.

While the implementations illustrated above may use a distinct working representation for every position within the working state at every round, it is possible to re-use representations to arrive at a smaller set of pre-computation tables. This may be achieved by associating each pre-multiplication table to the round and position within the working state that will provide its lookup index, and also by associating each pre-multiplication table output-element to the round and position within the working state that will receive its output. In this way, one may assign working representations to the input and output of the pre-multiplication tables, and may propagate them recursively to the round/position pairs for the working state representation, which may in turn define the required representation for other pre-multiplication tables, and so on.

Other modifications besides these mentioned modifications are also permitted. Furthermore, while the above description mentioned circuits and implementations that may be provided solely in hardware, certain embodiments may be implemented as software running on hardware.

Figure 6:
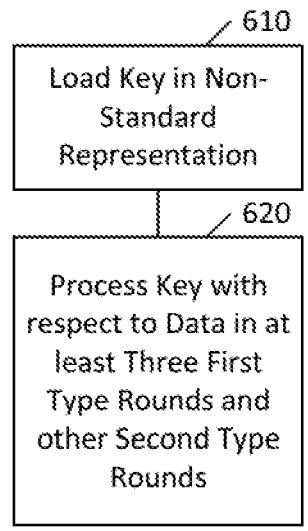
FIG. 6 illustrates a method according to certain embodiments of the present invention.

FIG. 6 illustrates a method according to certain embodiments of the present invention. As shown in FIG. 6, a method can include, at 610, loading a key in a non-standard representation. The method can also include, at 620, processing the key with respect to data in at least three first type rounds and a plurality of second type rounds.

The first type rounds can be the non-permuted rounds, such as those shown in FIG. 2 and FIG. 3. The second type rounds can be the permuted rounds, such as those shown in FIG. 2, FIG. 4, and FIG. 5.

The processing the key with respect to data can include either encrypting the data using the key or decrypting the data using the key. Thus, certain embodiments may apply to a process that is for encryption, a process that is for decryption, or for a process that is used at one time for encryption and at another time for decryption.

The first type rounds can be configured to maintain an order of channels of bits at an output from the order of corresponding channels of bits at an input. The second type rounds can be configured to vary the order of channels of bits at an output from the order of corresponding channels of bits at an input.

The second type rounds and at least one of the first type rounds can be configured to perform encryption or decryption in accordance with a symmetric block cipher. For example, the second type rounds and at least one of the first type rounds can be configured to perform encryption or decryption in accordance with an advanced encryption standard specification. Thus, the remaining rounds can be used for other purposes, such as allowing the key to be provided in a non-standard representation, and to make sure that the intermediate stages are also in non-standard representations.

Loading the key can include loading a sequence of bytes having a non-linear relationship to the key. Examples of how to do such loading are provided above.

The processing can include dividing a 128-bit input into 16 8-bit channels, each including adjacent signals. Other ways of dividing the input, and other sizes of input, are also permitted. FIGS. 3 and 4 provide concrete examples of dividing a 128-bit input into 16 8-bit channels.

The processing can further include routing each channel to a distinct look-up table. This is also illustrated, for example, in FIGS. 3-5, where the input channels are shown routed respectively to LUT0, LUT1, and so on.

The processing can include using a first look-up table for the first first type round and a second look-up table for the second first type round. More particularly, the processing can include using a first set of look-up tables for the first first type round and a second set of look-up tables for the second first type round. In other words, LUT0 through LUT15 for a given round can be considered a single lookup table or can be considered a set of look-up tables. Each round can have its own separate set of look-up tables. In certain embodiments, various rounds may share a set of look-up tables.

The processing can include combining an at least 32-bit output of a look-up table with a 32-bit segment of a round key in an exclusive disjunction unit to provide an at least 32-bit output. This is illustrated, for example, in the 5-input XOR units (5-input XOR 0 through 5-input XOR 3) in FIGS. 3 through 5. In certain embodiments, more generally, at least four lookup table outputs can be combined with one at least 32-bit segment of round key.

The non-standard representation is selected from alternative representations comprising isomorphic mappings to fields defined by polynomials with coefficients in GF(2) modulo a degree-8 irreducible polynomial distinct from the Rijndael polynomial. The non-standard representation can apply an arbitrary bit-permutation and/or an arbitrary degree-7 polynomial addend with coefficients in GF(2).

A first representation of an ith 8-bit segment at an output of the first first type round can differ from a second representation of the ith 8-bit segment at an output of the second first type round. Thus, the representation of a given 8-bit segment can vary from round to round, over each of the rounds.

A look-up table can be configured to implement a composition of partial functions, wherein the partial functions can include a mapping between a standard representation and a non-standard representation and an arbitrary function. Thus, the look-up table may be used in place of actually performing the partial functions as such.

The above described method can be variously implemented. For example, the method can be implemented in hardware or in software running on hardware, or some combination thereof.

For example, an apparatus can include a first first type round unit provided at an input. The apparatus can also include a second first type round unit operatively connected to the first first type round unit. The apparatus can further include a plurality of second type round units operatively connected to the second first type round unit. The apparatus can additionally include a third first type round unit operatively connected to at least one of the plurality of second type round units and configured to provide an output based on data provided at the input. The first type rounds can be configured to maintain an order of channels of bits at an output from the order of corresponding channels of bits at an input. The second type rounds can be configured to vary the order of channels of bits at an output from the order of corresponding channels of bits at an input.

The first first type round unit, the second first type round unit, the plurality of second type round unit, and the third first type round unit can be arranged in a fully pipelined construction. For example, the round units can be arranged as shown in FIG. 2.

In a particular example, a first register can be provided between first first type round unit and the second first type round unit, a second register is provided between the second first type round unit and the plurality of second type round units, and a third register is provided between the plurality of second type round units and the third first type round unit. The first register, second register, and third register can share a common clock.

There can also be additional registers between each adjacent pair of second type round units of the plurality of second type round units. These additional registers can also share the common clock.

An alternative would be to have the round units arranged asynchronously. For example, the first first type round unit, the second first type round unit, the plurality of second type round unit, and the third first type round unit can be chained asynchronously.

The plurality of second type round units and at least one of the first type rounds can be configured to perform encryption or decryption in accordance with a symmetric block cipher. More particularly, the plurality of second type round units and at least one of the first type rounds can be configured to perform encryption or decryption in accordance with an advanced encryption standard specification.

The first first type round unit can be configured to receive at least a portion of a key represented in a non-standard representation. For example, the non-standard representation can be selected from alternative representations comprising isomorphic mappings to fields defined by polynomials with coefficients in GF(2) modulo a degree-8 irreducible polynomial distinct from the Rijndael polynomial. The non-standard representation can apply an arbitrary bit permutation and/or an arbitrary degree-7 polynomial addend with coefficients in GF(2).

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:
1. An apparatus, comprising:
a first first type round unit provided at an input;
a second first type round unit operatively connected to the first first type round unit;
a plurality of second type round units operatively connected to the second first type round unit; and
a third first type round unit operatively connected to at least one of the plurality of second type round units and configured to provide an output based on data provided at the input, wherein the first first type round unit, the second first type round unit, and the third first type round unit are configured to maintain an order of channels of bits at an output from the order of corresponding channels of bits at an input, and wherein the plurality of second type round units are configured to vary the order of channels of bits at an output from the order of corresponding channels of bits at an input, wherein the first first type round unit is configured to receive at least a portion of a key represented in a non-standard representation, wherein the non-standard representation is selected from alternative representations comprising isomorphic mappings to fields defined by polynomials with coefficients in GF(2) modulo the 30 degree-8 irreducible polynomials.

2. An apparatus, comprising:
a first first type round unit provided at an input;
a second first type round unit operatively connected to the first first type round unit;
a plurality of second type round units operatively connected to the second first type round unit; and
a third first type round unit operatively connected to at least one of the plurality of second type round units and configured to provide an output based on data provided at the input, wherein the first first type round unit, the second first type round unit, and the third first type round unit are configured to maintain an order of channels of bits at an output from the order of corresponding channels of bits at an input, and wherein the plurality of second type round units are configured to vary the order of channels of bits at an output from the order of corresponding channels of bits at an input, wherein the first first type round unit is configured to receive at least a portion of a key represented in a non-standard representation, wherein the non-standard representation applies an arbitrary polynomial addend with coefficients in GF(2).

* * * * *